(12) United States Patent
Navntoft

(10) Patent No.: US 7,301,555 B2
(45) Date of Patent: Nov. 27, 2007

(54) CAMERA TELEPHONE DEVICE

(75) Inventor: Jacob Navntoft, Helsingør (DK)

(73) Assignee: Nokia Corporation, Espoo (FI)

( * ) Notice: Subject to any disclaimer, the term of this patent is extended or adjusted under 35 U.S.C. 154(b) by 405 days.

(21) Appl. No.: 10/712,488

(22) Filed: Nov. 13, 2003

(65) Prior Publication Data

US 2005/0104955 A1    May 19, 2005

(51) Int. Cl.
*H04N 7/14* (2006.01)
(52) U.S. Cl. .............................. 348/14.02; 348/14.01; 348/211.12; 455/556.1
(58) Field of Classification Search .. 348/14.01–14.09, 348/211.12, 211.13; 379/433.02, 433.04, 379/433.05, 433.06, 433.03, 428.01, 433.13; 455/556.1, 566
See application file for complete search history.

(56) References Cited

U.S. PATENT DOCUMENTS

2004/0189861 A1* 9/2004 Tom ........................... 348/375

FOREIGN PATENT DOCUMENTS

JP    2003-158727    *    5/2003

* cited by examiner

*Primary Examiner*—Melur Ramakrishnaiah
(74) *Attorney, Agent, or Firm*—Perman & Green, LLP

(57) ABSTRACT

A telephone comprises a camera, a display and processing and communication circuitry. The camera is located in a first body part of the telephone and the display is located in a second body part of the telephone. The body parts are joined via a tilt and swivel hinge, which allows movement of the body parts between at least a first and a second position relative to each other. The first relative position is such that the camera and the display are facing in a first direction. The second relative position is such that the camera and the display are facing in substantially different directions. The hinge can actuate electric switching means connected to the circuitry in the telephone when allowing movement of the body parts between the two positions relative to each other. The processing and communication circuitry is configured to detect the actuation of the electric switching means.

12 Claims, 3 Drawing Sheets

CAMERA TELEPHONE DEVICE

BACKGROUND OF THE INVENTION

1. Field of the Invention

The present invention relates to a telephone device and a hinge unit in a telephone device, the telephone comprising a camera and a display that is configured to be used in an exchange of multimedia content, including image sequences, between device users.

2. Brief Description of Related Developments

Communication devices have during the last decades evolved from being more or less primitive telephones, capable of conveying only narrow band analog signals such as voice conversations, into the multimedia mobile devices of today capable of conveying large amounts of data representing any kind of media. For example, a telephone in a GSM, GPRS, EDGE, UMTS or CDMA2000 type of system is capable of recording, conveying and displaying both still images and moving images, i.e. video streams, in addition to audio data such as speech or music.

A camera equipped communication device can be used in a number of different applications. For example, in addition to a function where an image or a sequence of images are recorded and transmitted to another device by way of, e.g., MMS (Multimedia Messaging Service) or as attachments to E-mail messages, image sequences can be used in more interactive two-way communication functions, such as a video conference. Such a function involves a need to display image to a viewer both when imaging in a first direction away from viewer as well as displaying image towards the viewer when imaging himself when participating in the video conference.

The control circuitry and control software of such a communication device needs to know whether the imaging is for the purpose of, e.g., a video conference between the user of the device where the display should be in essentially the same direction as the field of view of a camera performing the imaging, or for the purpose of, e.g., the user imaging a scene where the display should be directed towards the user while the field of view of a camera is essentially in the opposite direction.

This dual functionality is usually achieved by way of providing a communication device with two cameras, a first and a second camera having their respective field of view directed essentially in opposing directions. An example of such a device is the FOMA P2102V telephone, which has a main telephone body and a part, configured to be rotated, comprising a display. The telephone is equipped with two built-in cameras. A first camera is located on the rotatable part and has a field of view such that a person is able to look at the display while at the same time being imaged by the first camera. A second camera is located in the main body of the telephone and is intended for use when performing conventional imaging, i.e. using the device as a conventional digital camera. Needless to say, a drawback with such a device is that it is expensive and also unnecessarily complex. Two cameras arranged in the communication device require extra wiring and additional physical space.

Another example of a camera telephone that is capable of imaging in different directions is the Samsung SGH-P400 camera telephone. The camera is arranged in a hinge part of the telephone and the camera can be rotated in order to enable imaging in different directions. However, this is a complex solution, taking up a relatively great deal of space and it is thereby expensive.

SUMMARY OF THE INVENTION

In view of the above identified drawbacks related to camera equipped communication devices according to prior art, it is an object of the present invention to provide an improved communication device capable of imaging and displaying images.

The object is achieved in a first aspect by way of a telephone according to claim 1 and in a second aspect by way of a hinge unit in a telephone according to claim 6.

The telephone comprises a camera for recording images, a display for displaying the images and processing and communication circuitry for processing and communicating the images. The camera is located in a first body part of the telephone and the display is located in a second body part of the telephone. The two body parts are electrically and mechanically joined via a tilt and swivel hinge, which is configured to allow movement of the first and second body parts between at least a first and a second position relative to each other, where the first relative position is such that the field of view of the camera is directed in a first direction and the display is facing substantially in the first direction. The second relative position is such that the field of view of the camera is directed in the first direction and the display is facing in a second direction substantially different from the first direction. The hinge is further configured to actuate electric switching means connected to the circuitry in the telephone when allowing movement of the body parts between the two positions relative to each other, and the processing and communication circuitry is configured to detect said actuation of said electric switching means.

An effect of the invention is that it enables the circuitry and software of the telephone to detect, via the actuation of the switching means, whether the two body parts of the telephone is in a first or a second position relative to each other. That is, it is capable of detecting whether the camera is pointing in the same direction or in a different direction with respect to the direction which the display is facing. This is advantageous in that it indicates to the circuitry and software whether the camera equipped telephone is being used in a camcorder mode or a self-portrait mode. That is, the user does not have to indicate by way of, e.g., pushing a switch or enter a command in order to indicate to the circuitry and software how the device is to be operated.

An advantage of the invention is that it is simple, and thereby non-expensive, as well as being robust.

In a preferred embodiment of the invention, the tilt and swivel hinge comprises a washer having at least one cam and that the washer is configured to rotate when the hinge allows movement of the body parts between the first and second position relative to each other, and where at least one cam is configured to actuate the electric switching means. The washer may have more than one cam and the washer may either form an integral part of an axis which provides swivel motion between the two body parts, or the washer may be in the form of a separate part attached to the swivel axis.

The switching means may advantageously comprise a multi-position switch, which when acted upon by the cam is capable of indicating to the circuitry and software a plurality of different switching states and thereby providing detailed information regarding the relative position between the two body parts of the telephone.

An advantage of a hinge unit according to the invention is that it is easy, and thereby non-expensive, to install during the assembly process since the electric switch is preferably attached to or a part of the hinge.

DETAILED DESCRIPTION OF PREFERRED EMBODIMENTS

Figures 1A, 1B, 1C:
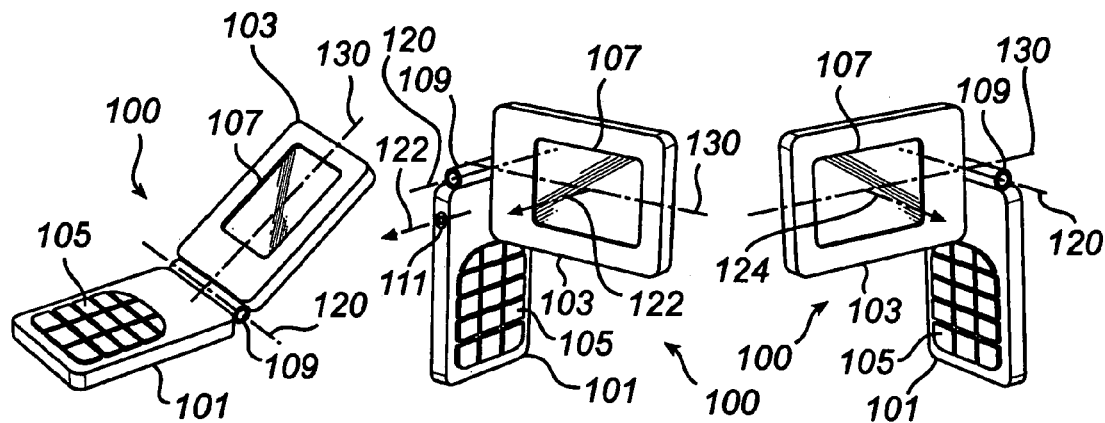
FIGS. 1a–1c are schematically drawn perspective views of a telephone according to the present invention.

FIGS. 1a, 1b and 1c are three different perspective views of a telephone 100 according to the present invention. The view in FIG. 1a shows the telephone 100 with a first body part 101 and a second body part 103. The first body part 101 comprises a keyboard 105 and the second body part 103 comprises a display 107. A tilt and swivel hinge 109 connects the two body parts 101, 103 together and in FIG. 1a the two body parts 101, 103 are in a position relative to each other where they are slightly tilted with respect to each other around a tilt axis 120. A swivel axis 130, around which the second body part 103 can swivel, is also indicated in FIG. 1a. The situation illustrated in FIG. 1a is one during which a user of the telephone 100 may manipulate and input information via the keyboard 105 while at the same time viewing output information on the display 107.

The view in FIG. 1b shows the two body parts 101, 103 in a position relative to each other, which is different from the relative position shown in FIG. 1a. Moreover, in FIG. 1b a camera 111 is shown, which is comprised in the first body part 101. The camera 111 has a field of view directed in a first direction 122. The second body part 103, with its display 107, is in FIG. 1b tilted around the tilt axis 120 and swiveled around the swivel axis 130. Thereby, FIG. 1b illustrates a first relative position between the body parts 101, 103. The display 107 faces in a direction 122', which is substantially the same as the first direction 122. The situation illustrated in FIG. 1b is one during which a user of the telephone 100 is in the field of view of the camera 111 while at the same time the user is viewing output information, such as images or image sequences, on the display 107.

The view in FIG. 1c shows the two body parts 101, 103 in a position relative to each other, which is different from the relative positions shown in FIGS. 1a and 1b. The second body part 103, with its display 107, is in FIG. 1c tilted around the tilt axis 120 and swiveled around the swivel axis 130. The tilt around tilt axis 120 is substantially the same as in the situation shown in FIG. 1b and the swivel around swivel axis 130 is substantially different from the situation shown in FIG. 1b. Thereby, FIG. 1c illustrates a second relative position between the body parts 101, 103. The display 107 faces in a direction 124, which is substantially different from the first direction 122. The situation illustrated in FIG. 1c is one during which a user of the telephone 100 may use the camera 111 to image scenery in the first direction 122, while at the same time viewing output information, such as images or image sequences, on the display 107.

Figure 2:
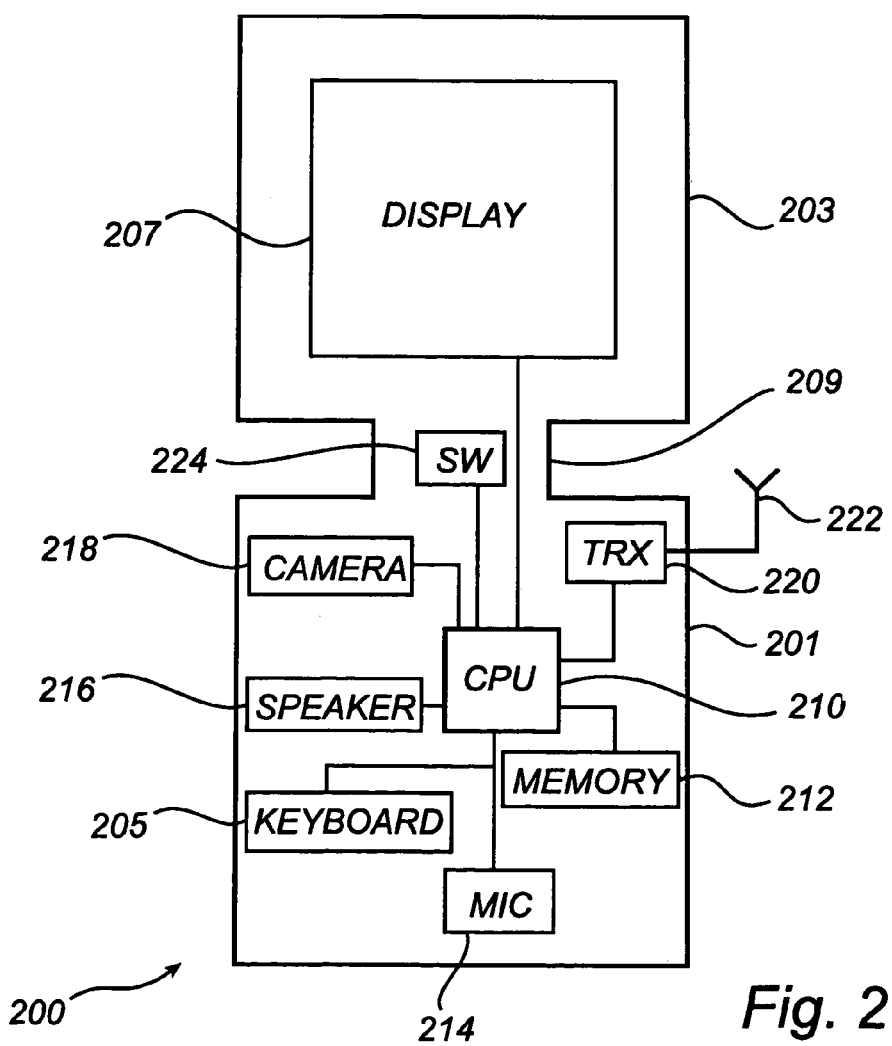
FIG. 2 is a functional block diagram of a telephone according to the present invention.

FIG. 2 shows a block diagram of a telephone 200 according to the present invention. A first body part 201 comprises a processing unit 210 connected to an antenna 222 via a transceiver 220, a memory unit 212, a microphone 214, a keyboard 205, a speaker 216 and a camera 218. The processing unit 210 is also connected to a display 207, which is comprised in a second body part 203 of the telephone 200.

No detailed description will be presented regarding the specific functions of the different blocks of the telephone 200. In short, however, as the person skilled in the art will realize, the processing unit 210 controls the overall function of the functional blocks in that it is capable of receiving input from the keyboard 205, audio information via the microphone 214, images via the camera 218 and receive suitably encoded and modulated data via the antenna 222 and transceiver 220. The processing unit 210 is also capable of providing output in the form of sound via the speaker 216, images via the display 207 and suitably encoded and modulated data via the transceiver 220 and antenna 222.

The second body part 203 is mechanically connected to the first body part 201 via a tilt and swivel hinge 209. The display 207 is electrically connected to the processing unit 210 via electric connection means (not shown in FIG. 2) comprised in the hinge 209. The hinge 209 is configured, when it allows relative movement of the two body parts 201, 203, to actuate an electric switch 224. The switch 224 is connected to the processing unit 210 and is thereby capable of conveying information regarding the relative position of the two body parts 201, 203. A more detailed description of the hinge 209 and its actuating function will be discussed in more detail below in connection with FIGS. 3 to 5.

It is to be noted that the different blocks that have been described above are functional blocks and do not necessarily correspond to actual hardware units in a one-to-one relationship. As the skilled person will realize, functionality comprised in the blocks of FIG. 2 may, wholly or in part, be comprised in one or more integrated circuits in the form of any mixture of programmable and non-programmable circuits.

Figure 3A:
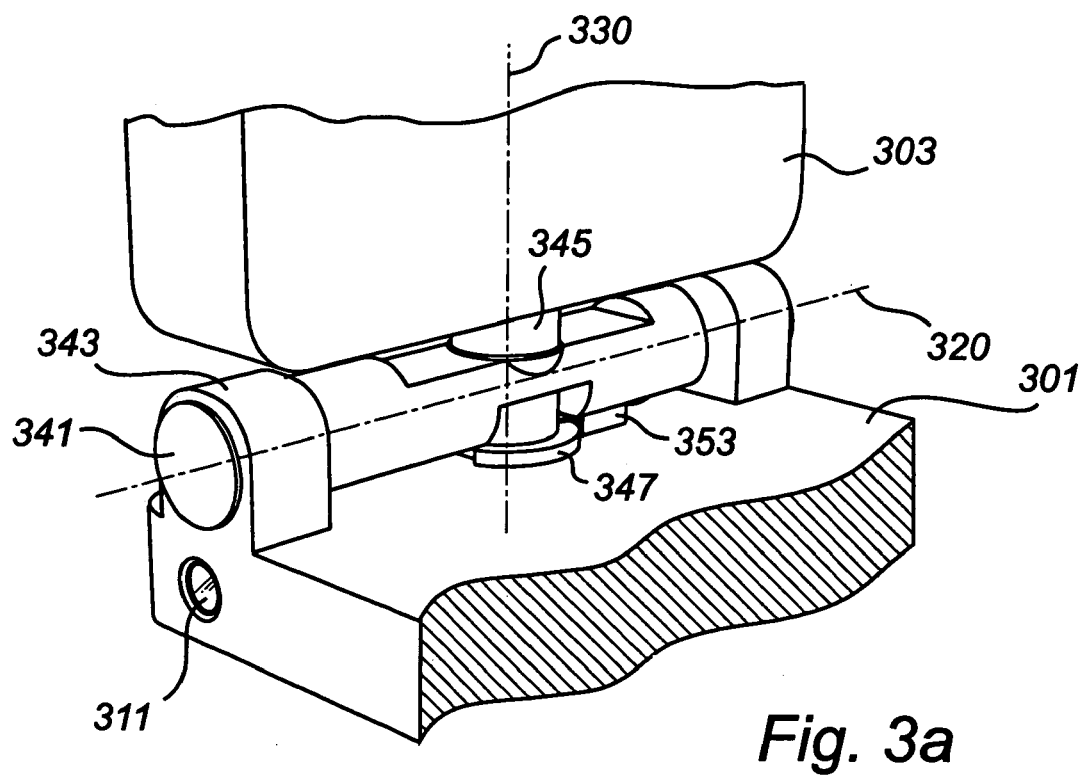
FIGS. 3a and 3b are schematically drawn perspective views of a part of a telephone according to the present invention.
Figure 3B:
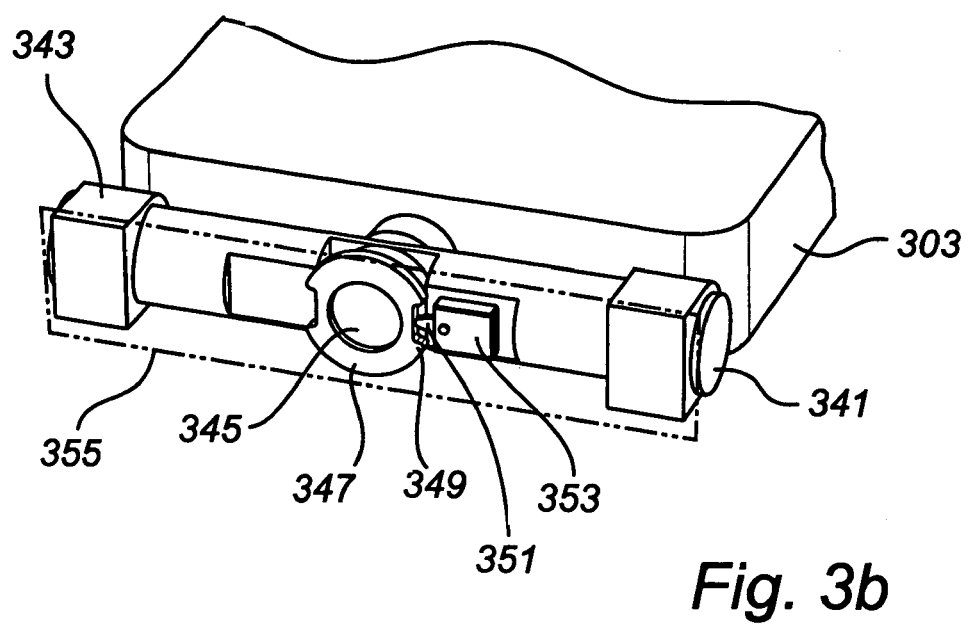

FIGS. 3a and 3b illustrate in some more detail a hinge section of a mobile telephone according to the present invention. The hinge section illustrated in FIGS. 3a and 3b may be the hinge 109 of the telephone 100 in FIGS. 1a–1c or the hinge 209 of the telephone described in connection with FIG. 2.

A first body part 301 and a second body part 303 of a telephone are indicated in FIG. 3a. As in the previous examples of FIGS. 1 and 2, the two body parts 301, 303 comprise a camera 311, a keyboard and a display. However, for the sake of clarity, FIGS. 3a and 3b do not show a keyboard or a display.

Arranged between the two body parts 301, 303 is a tilt axis member 341 arranged in supporting means 343 of the first body part 301. The tilt axis member 341 enables rotation of the body parts 301, 303 around a tilt axis 320.

The second body part 303 is attached to a swivel axis member 345, which enables the first body part 303 to swivel around a swivel axis 330. The swivel axis member 345 extends through the tilt axis member 341 and a washer 347 is attached at its end. The two axes 341, 345 thereby form a single hinge unit (109 in FIGS. 1a–c).

The washer 347 is configured with cams 349 that are capable of engaging a switch lever 351 of an electric switch 353, which is attached to the tilt axis member 341. The electric switch 353 is electrically connected to circuitry of the telephone, as mentioned above in connection with FIG. 2, via electric connectors arranged on a flex-film 355. When the second body part 303 swivels around the swivel axis 330, the washer 347 rotates with the swivel axis member 345 and the cams 349 on the washer 347 engage the switch lever 351. Thereby the status of the electric switch 353 changes from a first position to a second position and hence the circuitry of the telephone may sense that the second body part 303 has been swiveled around the swivel axis 330.

Figure 4:
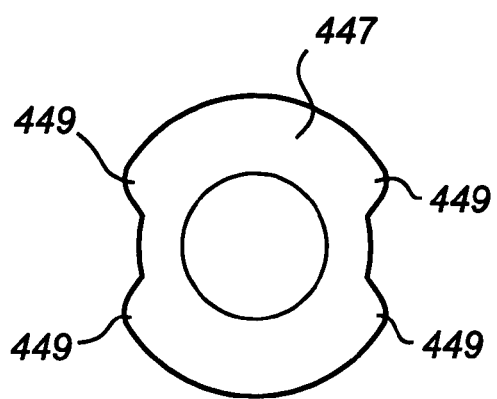
FIGS. 4 and 5 illustrate two examples of a washer with cams for use in a telephone according to the present invention.
Figure 5:
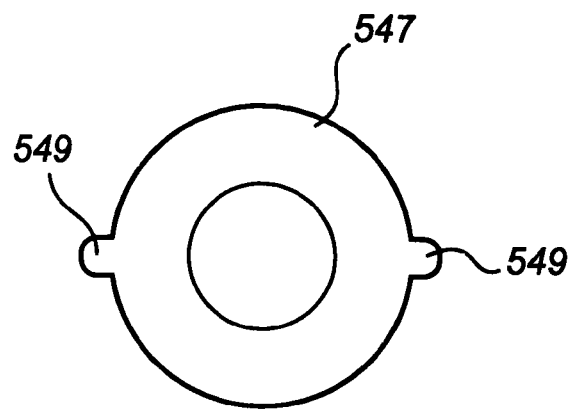

FIGS. 4 and 5 each illustrates an alternative configuration of a washer with cams. In FIG. 4 a washer 447 has four cams 449 and in FIG. 5 a washer 547 has two cams 549. These configurations illustrate that, depending on the number of cams, the switch (e.g. switch 353 of FIGS. 3*a* and 3*b*) can be actuated any number of times during a swiveling rotation of a body part of a telephone according to the present invention.

What is claimed is:

1. A portable device comprising a camera for recording images, a display for displaying said images and processing and communication circuitry for processing and communicating said images, where:
    said camera is located in a first body part of the portable device and said display is located in a second body part of the portable device;
    said first and second body parts are electrically and mechanically joined via a tilt and swivel hinge;
    said hinge is configured to allow movement of said first and second body parts between at least a first and a second position relative to each other;
    said first relative position is such that the field of view of the camera is directed in a first direction and the display is facing substantially in said first direction;
    said second relative position is such that the field of view of the camera is directed in said first direction and the display is facing in a second direction substantially different from said first direction;
    said hinge is further configured to actuate an electric switch connected to the circuitry in the portable device when allowing movement of the body parts between said first and second position relative to each other, wherein the hinge comprises a washer having at least one cam and said washer is configured to rotate when said hinge allows movement of the body parts between the first and second position relative to each other and where the at least one cam is configured to actuate said electric switch and actuation of the electric switch causes an image recording mode of the portable device to be switched from a first image recording mode to at least a second image recording mode; and
    said processing and communication circuitry is configured to detect said actuation of said electric switch.

2. A portable device according to claim 1, where said washer forms an integral part of an axis which provides swivel motion between the first and second body parts of the portable device.

3. A portable device according to claim 1, where said washer is a separate part attached to an axis which provides swivel motion between the first and second body parts of the portable device.

4. A portable device according to any one of claim 1 to claim 3, where said electric switch comprises a multi-position switch.

5. The portable device of claim 1, wherein the image recording mode is switched between a camcorder mode and a self-portrait mode.

6. The portable device of claim 5, wherein the self-portrait mode comprises the field of view of the camera being directed in a first direction and the display facing substantially in the first direction, and the camcorder mode comprises the field of view of the camera being directed in the first direction and the display facing in a second direction substantially different from the first direction.

7. A portable device according to claim 1 wherein the hinge comprises a tilt axis member attached to the first body part and a swivel axis member configured to attach the second body part to the tilt axis member, wherein the washer is located on the swivel axis member and the electric switch is located on the tilt axis member.

8. A tilt and swivel hinge unit in a portable device, said portable device comprising a camera for recording images, a display for displaying said images and processing and communication circuitry for processing and communicating said images, where:
    said camera is located in a first body part of the portable device and said display is located in a second body part of the portable device;
    said first and second body parts are electrically and mechanically joined via said tilt and swivel hinge;
    said hinge is configured to allow movement of said first and second body parts between at least a first and a second position relative to each other;
    said first relative position is such that the field of view of the camera is directed in a first direction and the display is facing substantially in said first direction;
    said second relative position is such that the field of view of the camera is directed in said first direction and the display is facing in a second direction substantially different from said first direction;
    said hinge is further configured to actuate an electric switch connected to the circuitry in the portable device when allowing movement of the body parts between said first and second position relative to each other, wherein the hinge comprises a washer having at least one cam and said washer is configured to rotate when said hinge allows movement of the body parts between said first and second position relative to each other and where said at least one cam is configured to actuate said electric switch and actuation of the electric switch causes an image recording mode of the portable device to be switched from a first image recording mode to at least a second image recording mode; and
    said processing and communication circuitry is configured to detect said actuation of said electric switch.

9. A hinge unit according to claim 8, where said washer forms an integral part of an axis which provides swivel motion between the first and second body parts of the portable device.

10. A hinge unit according to claim 8, where said washer is a separate part attached to an axis which provides swivel motion between the first and second body parts of the portable device.

11. A hinge unit according to claim 8, where said electric switch comprises a multi-position switch.

12. A hinge according to claim 8 wherein the hinge comprises a tilt axis member attached to the first body part and a swivel axis member configured to attach the second body part to the tilt axis member, wherein the washer is located on the swivel axis member and the electric switch is located on the tilt axis member.

* * * * *